(12) United States Patent
Shrivastava et al.

(10) Patent No.: US 8,620,348 B2
(45) Date of Patent: Dec. 31, 2013

(54) DIRECTIONAL PEER-TO-PEER NETWORKING

(75) Inventors: Vivek Vishal Shrivastava, San Francisco, CA (US); Hawk Yin Pang, San Jose, CA (US); Vidya Raghavan Setlur, Portola Valley, CA (US); Raja Bose, Mountain View, CA (US); Quinn Able Jacobson, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 125 days.

(21) Appl. No.: 13/356,671

(22) Filed: Jan. 24, 2012

(65) Prior Publication Data

US 2013/0190005 A1 Jul. 25, 2013

(51) Int. Cl.
*H04W 24/00* (2009.01)
(52) U.S. Cl.
USPC ............... 455/456.1; 455/414.2; 455/457
(58) Field of Classification Search
USPC .................................. 370/338, 328
See application file for complete search history.

(56) References Cited

U.S. PATENT DOCUMENTS

| 2004/0242274 | A1* | 12/2004 | Corbett et al. | ............. 455/562.1 |
|---|---|---|---|---|
| 2006/0116160 | A1 | 6/2006 | Fuccello | |
| 2006/0215624 | A1 | 9/2006 | Adya et al. | |
| 2008/0139125 | A1 | 6/2008 | Son et al. | |
| 2009/0136909 | A1* | 5/2009 | Asukai et al. | ................ 434/236 |
| 2010/0014463 | A1* | 1/2010 | Nagai et al. | .................... 370/328 |
| 2010/0020770 | A1* | 1/2010 | Qin et al. | ...................... 370/336 |
| 2010/0150077 | A1* | 6/2010 | Nanda et al. | .................. 370/328 |
| 2010/0214923 | A1* | 8/2010 | Vivanco et al. | ............... 370/235 |
| 2011/0064010 | A1 | 3/2011 | Zhong et al. | |
| 2012/0039316 | A1* | 2/2012 | Park et al. | ..................... 370/338 |

OTHER PUBLICATIONS

Murtaza Zafer et al, "Cooperative Transmit-Power Estimation under Wireless Fading", MobiHoc '08, May 26-30, 2008, Hong Kong, China, 10 pages.

* cited by examiner

*Primary Examiner* — Kwasi Karikari
(74) *Attorney, Agent, or Firm* — Squire Sanders (US) LLP

(57) ABSTRACT

Interaction between wireless devices, one of which may be equipped with a directional radio (a radio with a directional antenna for directional sensing capabilities) can be used in directional peer-to-peer networking. A method can include obtaining, at a first device from a serving device, proximity information regarding a second device. The method can also include obtaining, at the first device from the serving device, direction information regarding the second device. The method can further include calculating a position of the second device with respect to the first device based on the proximity information and based on the direction information. The method can additionally include communicating with the second device based on the position.

12 Claims, 16 Drawing Sheets

Possible discrete directions

Directional radio
enabled device

Estimating discrete proximity levels

FIG.3a  Possible Scenarios with V, LD1, LD2
Category 1 : LD1, LD2 on opposite direction of V
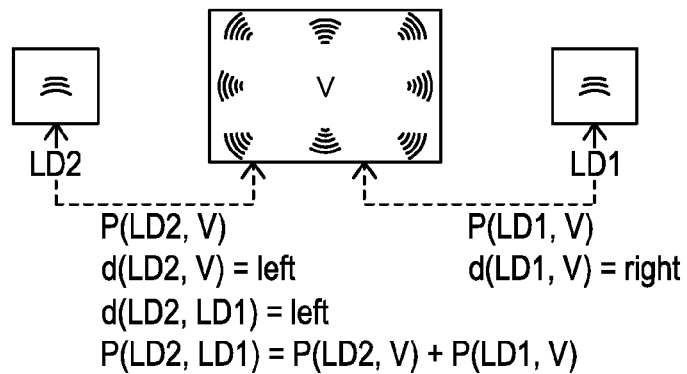
P(LD2, V)  P(LD1, V)
d(LD2, V) = left  d(LD1, V) = right
d(LD2, LD1) = left
P(LD2, LD1) = P(LD2, V) + P(LD1, V)
FIG.3b
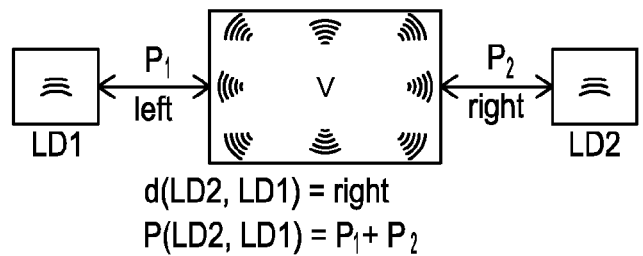
d(LD2, LD1) = right
P(LD2, LD1) = $P_1 + P_2$
FIG.3c
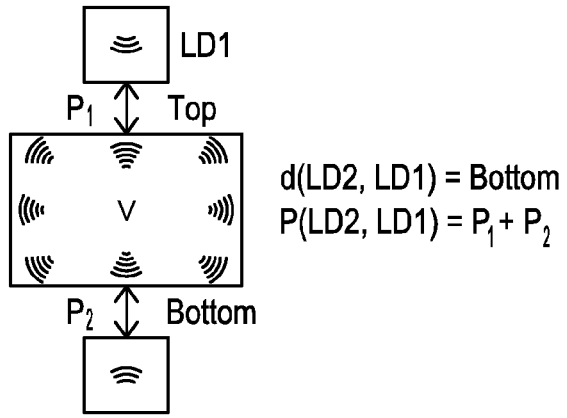
d(LD2, LD1) = Bottom
P(LD2, LD1) = $P_1 + P_2$
FIG.3d
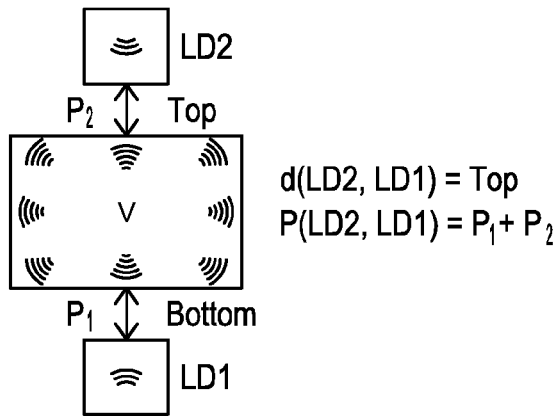
d(LD2, LD1) = Top
P(LD2, LD1) = $P_1 + P_2$ FIG.3e  Possible Scenarios with V, LD1, LD2
Category 1 : LD1, LD2 on opposite direction of V
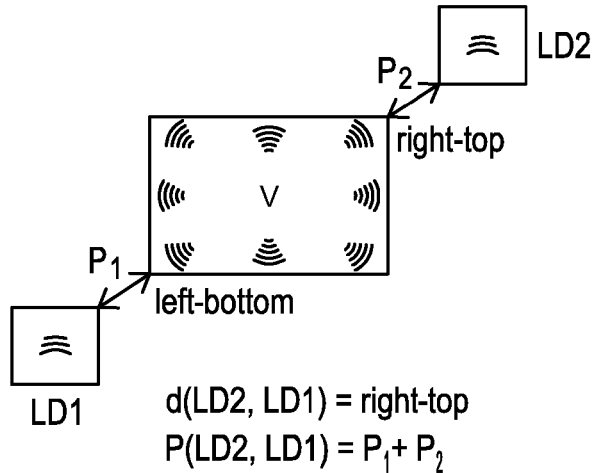
d(LD2, LD1) = right-top
P(LD2, LD1) = $P_1 + P_2$
FIG.3f
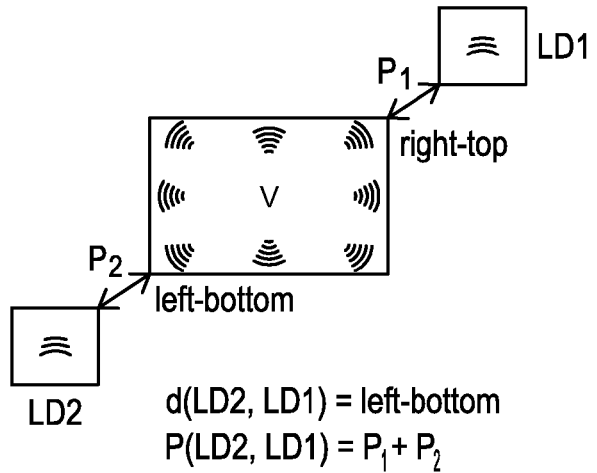
d(LD2, LD1) = left-bottom
P(LD2, LD1) = $P_1 + P_2$ FIG. 3g  Possible Scenarios with V, LD1, LD2
Category 1 : LD1, LD2 on opposite direction of V
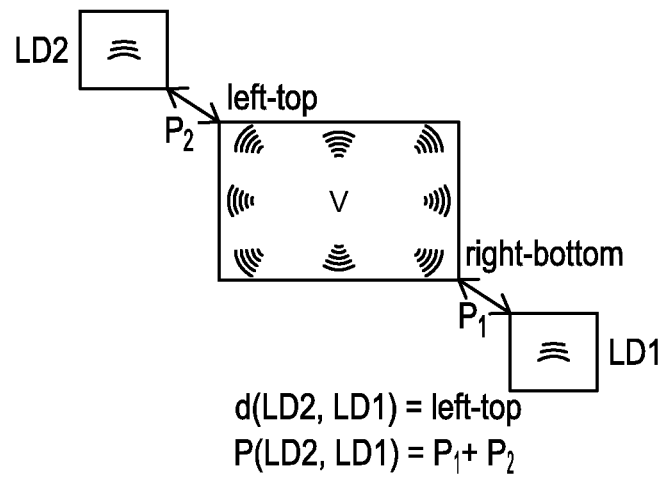
d(LD2, LD1) = left-top
P(LD2, LD1) = $P_1 + P_2$
FIG. 3h
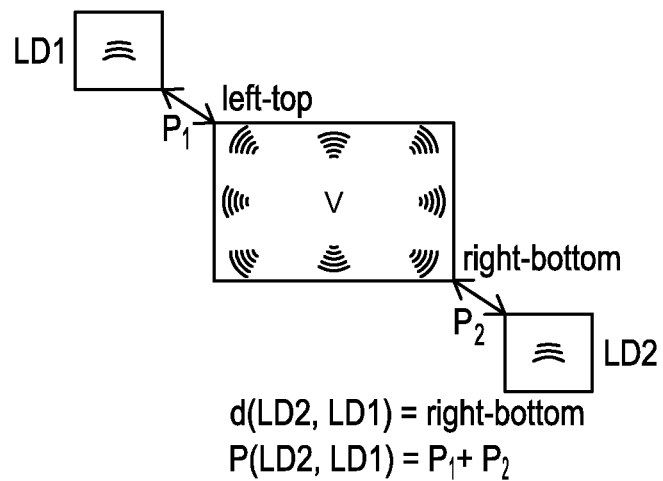
d(LD2, LD1) = right-bottom
P(LD2, LD1) = $P_1 + P_2$ Category 2 : LD1, LD2 on the same direction of V.

FIG. 3i

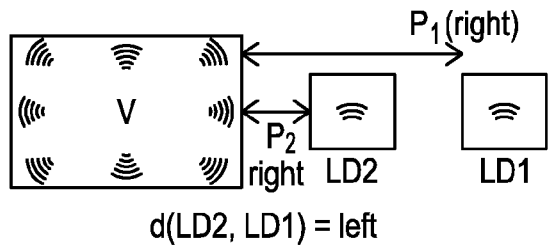

d(LD2, LD1) = left
P(LD2, LD1) = $P_1 - P_2$

FIG. 3j

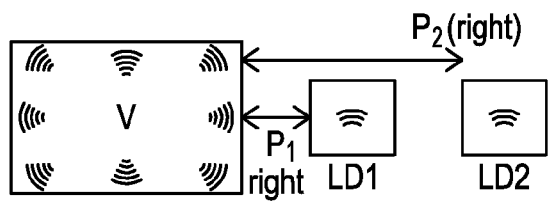

d(LD2, LD1) = left
P(LD2, LD1) = $P_2 - P_1$ similarly for left, top and bottom scenarios.

Category 3/4 :   when angle of separation is 90°

FIG. 3k

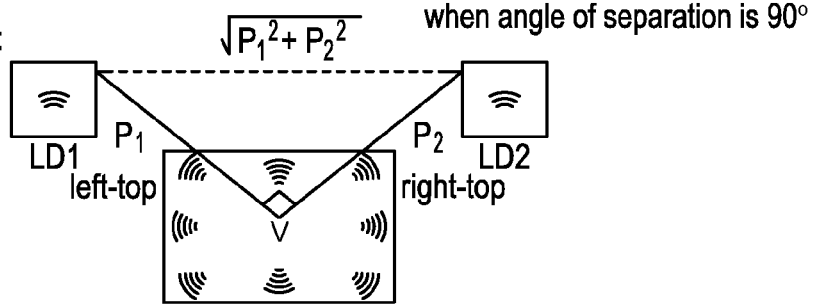

d(LD2, LD1) = right
P(LD2, LD1) = $\sqrt{P_1^2 + P_2^2}$ (continuous proximity)
P(LD2, LD1) = $P_1 + P_2$ (discrete mobility)

Similarly when (LD1, LD2) are in (left-bottom, right-bottom), (right-top, left-top), (right-bottom, left-bottom) respectively.

Category 5/6 : when angle of separation is 135° d(LD2, LD1) = right-bottom
P(LD2, LD1) = $\sqrt{P_1^2 + P_2^2 - 2 P_1 P_2 \cos 135°}$ when proximity is continuous.

P(LD2, LD1) = $P_1 + P_2$ when proximity is discrete.

Similar positions of LD1, LD2 can be solved using the above logic.

Category 7: When both devices are on the same side and angle of separation is less than 90°

Case a
When $|P_1 - P_2| \leq 1$ d(LD2, LD1) = top $P(LD2, LD1) = \sqrt{P_1^2 + P_2^2 - 2P_1P_2 \cos \theta°}$ if continuous P(LD2, LD1) = 1 if discrete Case b
When $|P_1 - P_2| > 1$ & $P_2 > P_1$ d(LD2, LD1) = top-right $P(LD2, LD1) = \sqrt{P_1^2 + P_2^2 - 2P_1P_2 \cos \theta°}$ if continuous $P(LD2, LD1) = P_2 - P_1$ if discrete

Case c
When $|P_1 - P_2| > 1$ & $P_1 > P_2$ $d(LD2, LD1)$ = left-top $P(LD2, LD1) = \sqrt{P_1^2 + P_2^2 - 2P_1P_2 \cos \theta°}$ if continuous $P(LD2, LD1) = P_2 - P_1$ if discrete

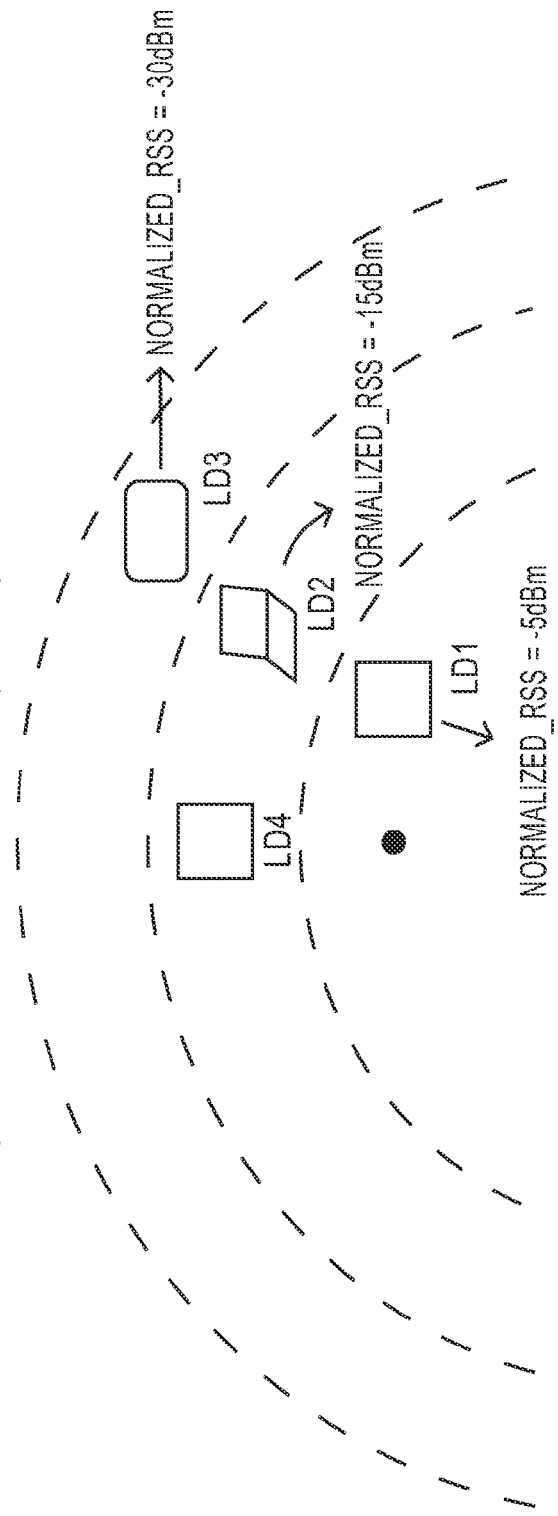

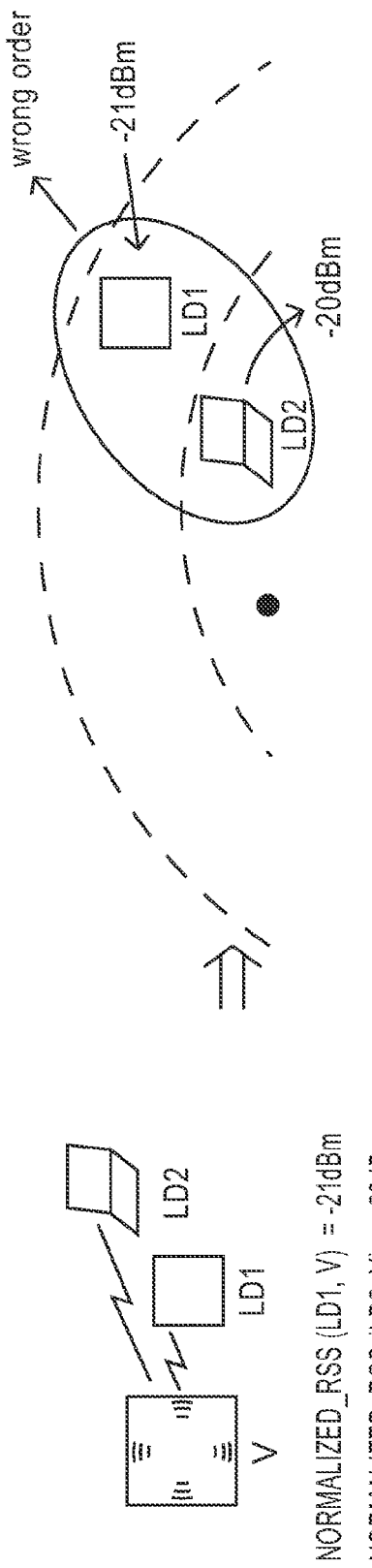

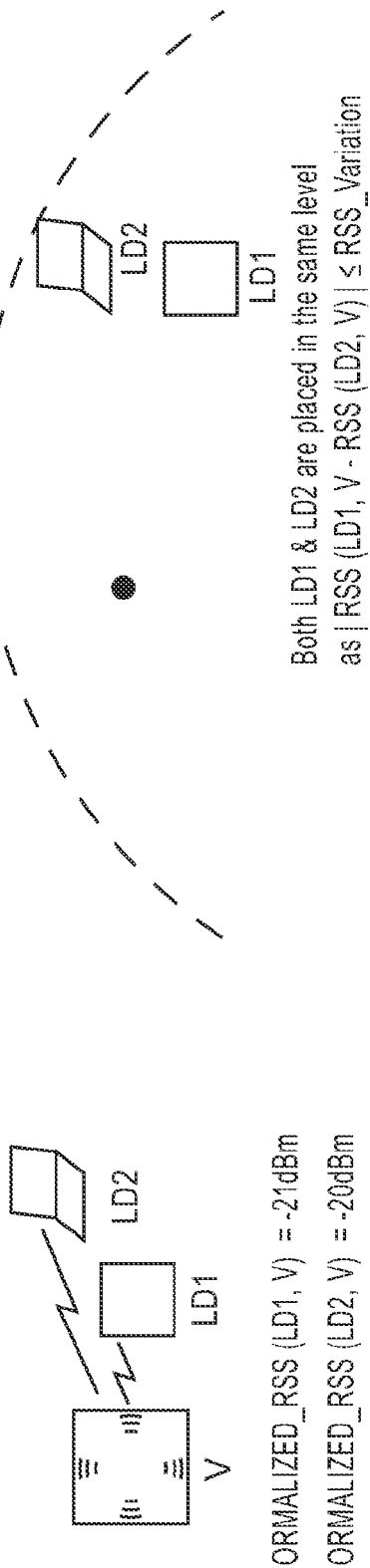

DIRECTIONAL PEER-TO-PEER NETWORKING

BACKGROUND

1. Field

Interaction between wireless devices, one of which may be equipped with a directional radio (a radio with a directional antenna for directional sensing capabilities) can be used in directional peer-to-peer networking. Wireless radios can be configured to infer the proximity of different nearby wireless devices and the direction of different signals and their originating devices.

2. Description of the Related Art

Conventionally, only devices which are enabled with directional radios can infer the direction of other wireless devices. Moreover, the interaction between legacy devices is not directional in nature. For example, directional gestures like flicking content from a legacy device to other legacy devices cannot be performed. Hence inferring the direction of different wireless devices is challenging for legacy devices.

Conventionally there is no inference or transfer of the proximity location information of a legacy device to itself or other legacy devices from a directional radio device.

SUMMARY

According to certain embodiments, a method includes obtaining, at a first device from a serving device, proximity information regarding a second device. The method also includes obtaining, at the first device from the serving device, direction information regarding the second device. The method further includes calculating a position of the second device with respect to the first device based on the proximity information and based on the direction information. The method additionally includes communicating with the second device based on the position.

A non-transitory computer readable medium is, in certain embodiments, encoded with instructions that, when executed in hardware, perform a process. The process includes obtaining, at a first device from a serving device, proximity information regarding a second device. The process also includes obtaining, at the first device from the serving device, direction information regarding the second device. The process further includes calculating a position of the second device with respect to the first device based on the proximity information and based on the direction information. The process additionally includes communicating with the second device based on the position.

An apparatus, according to certain embodiments, includes at least one processor and at least one memory including computer program code. The at least one memory and the computer program code are configured to, with the at least one processor, cause an apparatus at least to obtain, at a first device from a serving device, proximity information regarding a second device. The at least one memory and the computer program code are also configured to, with the at least one processor, cause an apparatus at least to obtain, at the first device from the serving device, direction information regarding the second device. The at least one memory and the computer program code are further configured to, with the at least one processor, cause an apparatus at least to calculate a position of the second device with respect to the first device based on the proximity information and based on the direction information. The at least one memory and the computer program code are additionally configured to, with the at least one processor, cause an apparatus at least to communicate with the second device based on the position.

In certain embodiments, an apparatus includes means for obtaining, at a first device from a serving device, proximity information regarding a second device. The apparatus also includes means for obtaining, at the first device from the serving device, direction information regarding the second device. The apparatus further includes means for calculating a position of the second device with respect to the first device based on the proximity information and based on the direction information. The apparatus additionally includes means for communicating with the second device based on the position.

According to certain embodiments, a method includes determining, at a serving device, first proximity information regarding a first device and second proximity information regarding a second device. The method also includes determining, at the serving device, first direction information regarding the first device and second direction information regarding the second device. The method further includes reporting the first proximity information and the first direction information to the second device. The method additionally includes reporting the second proximity information and the second direction information to the first device.

A non-transitory computer readable medium is, in certain embodiments, encoded with instructions that, when executed in hardware, perform a process. The process includes determining, at a serving device, first proximity information regarding a first device and second proximity information regarding a second device. The process also includes determining, at the serving device, first direction information regarding the first device and second direction information regarding the second device. The process further includes reporting the first proximity information and the first direction information to the second device. The process additionally includes reporting the second proximity information and the second direction information to the first device.

An apparatus, according to certain embodiments includes at least one processor and at least one memory including computer program code. The at least one memory and the computer program code are configured to, with the at least one processor, cause an apparatus at least to determine, at a serving device, first proximity information regarding a first device and second proximity information regarding a second device. The at least one memory and the computer program code are also configured to, with the at least one processor, cause an apparatus at least to determine, at the serving device, first direction information regarding the first device and second direction information regarding the second device. The at least one memory and the computer program code are further configured to, with the at least one processor, cause an apparatus at least to report the first proximity information and the first direction information to the second device. The at least one memory and the computer program code are additionally configured to, with the at least one processor, cause an apparatus at least to report the second proximity information and the second direction information to the first device.

In certain embodiments, an apparatus includes means for determining, at a serving device, first proximity information regarding a first device and second proximity information regarding a second device. The apparatus also includes means for determining, at the serving device, first direction information regarding the first device and second direction information regarding the second device. The apparatus further includes means for reporting the first proximity information and the first direction information to the second device. The apparatus additionally includes means for reporting the second proximity information and the second direction information to the first device.

BRIEF DESCRIPTION OF THE DRAWINGS

For proper understanding of the invention, reference should be made to the accompanying drawings, wherein:

FIG. 4 illustrates an environment including a user interface according to certain embodiments.

FIG. 5 illustrates ambiguities caused by received signal strength fluctuations.

FIG. 6 illustrates a case in which two devices can be displayed in a same level in terms of proximity.

DETAILED DESCRIPTION

Certain embodiments of the present invention infer and transfer the proximity location information of a legacy device to itself or other legacy devices from a directional radio device. Directional radio devices may be nodes that are equipped with one or more directional antennas.

More specifically, certain embodiments provide mechanisms and techniques by which a legacy device can infer the direction of other wireless devices in a system, given that there is at least one directional radio enabled device in the system. The directional radio enabled wireless device infers, in certain embodiments, the direction and proximity of nearby wireless devices and communicates this information to legacy devices. Legacy devices can use this information to determine the proximity and direction of other wireless devices in the system. This can enable directional interaction even between legacy wireless devices, like flicking content in the direction of a device, or the like. Using the direction and proximity information from the directional radio enabled device at legacy devices can enable legacy interactions at the legacy devices in ways that were not conventionally possible.

Figure 7:
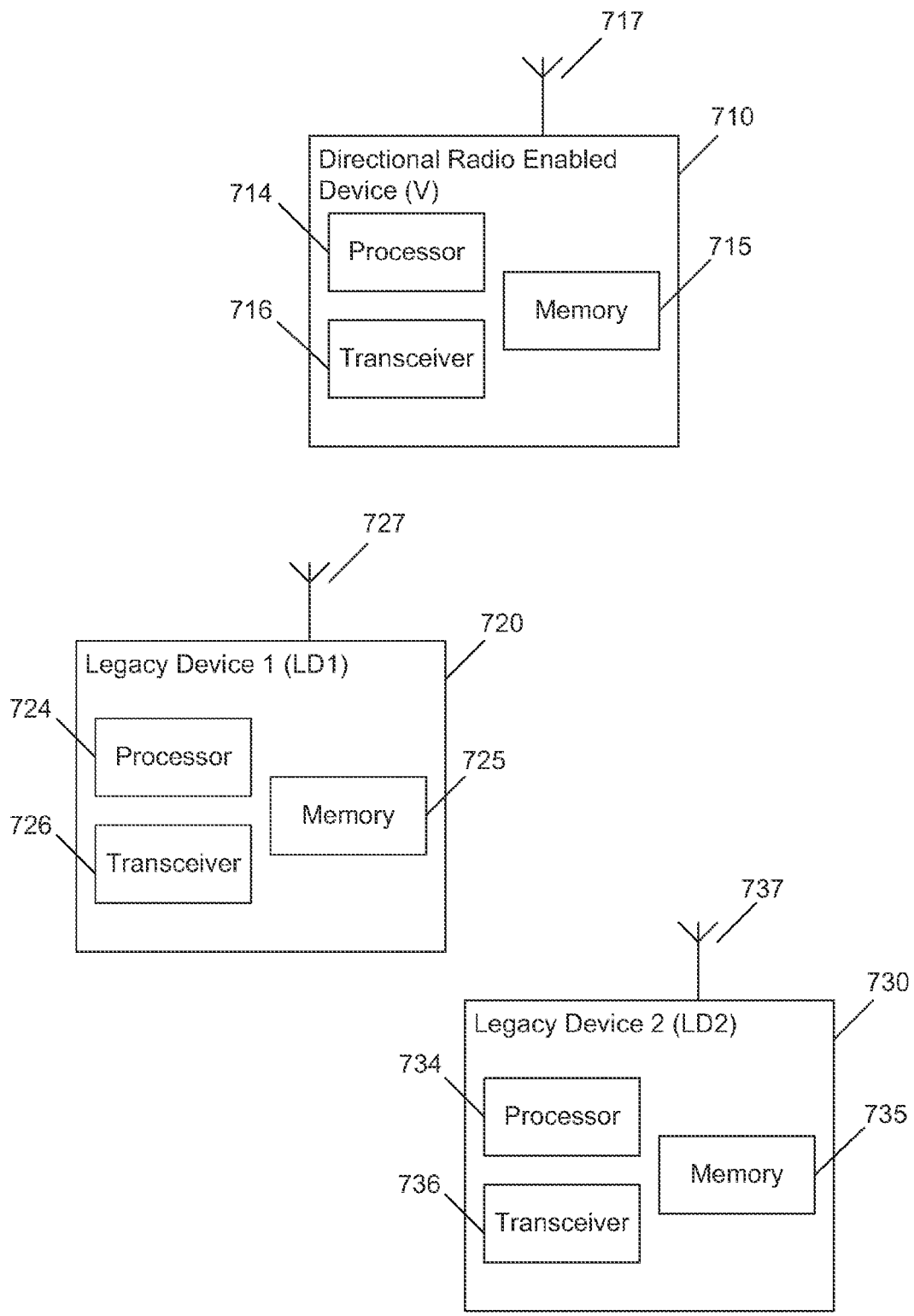
FIG. 7 illustrates a system according to certain embodiments.

FIG. 7 illustrates a system according to certain embodiments. In an example embodiment, a system may include three devices, directional radio enabled device (V) 710, legacy device 1 (LD1) 720, and legacy device 2 (LD2) 730. Each of the devices 710, 720, and 730 may be equipped with at least one processor (respectively 714, 724, and 734), at least one memory (respectively 715, 725, and 735) including computer program instructions or code, a transceiver (respectively 716, 726, and 736), and an antenna (respectively 717, 727, and 737).

Each transceiver 716, 726, and/or 736 can be a transmitter, a receiver, both a transmitter and a receiver, or a unit that is configured both for transmission and reception. The transceiver 716, 726, and/or 736 can be coupled to one or more respective antenna(s) 717, 727, and/or 737, which may include a directional antenna, such as in the case of the directional radio enabled device.

Each at least one processor 714, 724, and/or 734 can be variously embodied by any computational or data processing device, such as a central processing unit (CPU) or application specific integrated circuit (ASIC). The at least one processor 714, 724, and/or 734 can be implemented as one or a plurality of controllers.

Each at least one memory 715, 725, and/or 735 can be any suitable storage device, such as a non-transitory computer-readable medium. For example, a hard disk drive (HDD) or random access memory (RAM) can be used in the at least one memory 715, 725, and/or 735. The at least one memory 715, 725, and/or 735 can be on a same chip as the corresponding at least one processor 714, 724, and/or 734, or may be separate from the corresponding at least one processor 714, 724, and/or 734.

The computer program instructions may be any suitable form of computer program code. For example, the computer program instructions may be a compiled or interpreted computer program.

Each at least one memory 715, 725, and/or 735 and computer program instructions can be configured to, with the corresponding at least one processor 714, 724, and/or 734, cause a hardware apparatus (for example, directional radio enabled device 710, or legacy devices 720 and/or 730) to perform a process, such as the processes described below.

Thus, in certain embodiments, a non-transitory computer-readable medium can be encoded with computer instructions that, when executed in hardware perform a process, such as one of the processes described herein. Alternatively, certain embodiments of the present invention may be performed entirely in hardware.

The devices of the system may also include additional components. For example, each of directional radio enabled device (V) 710, legacy device 1 (LD1) 720, and legacy device 2 (LD2) 730 can include a user interface that is operable connected to the corresponding processor 714, 724, and/or 734 and corresponding memory 715, 725, and/or 735. That user interface can include a display, such as a liquid crystal display (LCD) or organic electroluminescent display (OELD), as well as speakers or audio outputs. Tactile outputs, such as a haptic feedback system, can also be included. The user interface may have a touch screen to receive user input. User input can also be provided by a keypad, keyboard, microphone, joystick, mouse, trackball, or other input device.

As discussed herein, direction and proximity can be particular measures used by the devices of the system. For example direction (d) can refer to the direction of a target wireless device with respect to a given wireless device. Thus, for example, d(D 1, D2) indicates the direction of D1 with respect to D2. Direction can be a continuous value (like a radian or a theta angle value in a polar coordinates) or a discrete value, such as one of eight possible combinations (for example, left, right, top, bottom, left-top, left-bottom, right-top, right-bottom or N, S, E, W, NW, NE, SW, SE). Other discrete value systems are also possible, such as 16 or 32 direction systems. A negative direction can refer to the exact opposite end of the direction, for example if d=right, then −d=left, or if d=right-top, then −d=left-bottom and so on. A discrete direction case is described herein in certain embodiments, but other approaches are also permitted. Discrete directions may help to minimize resources associated with storing and transmitting the direction information.

Figure 1:
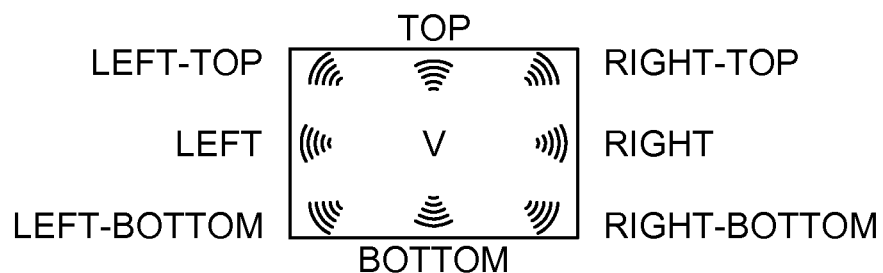
FIG. 1 illustrates possible discrete directions according to certain embodiments.

FIG. 1 illustrates possible discrete directions according to certain embodiments. As shown in FIG. 1, a directional radio enabled device (V) can report a direction of a signal according to one of eight directions illustrated. The directions illustrated at Left-Top, Top, Right-Top, Right, Right-Bottom, Bottom, Left-Bottom, and Left. The reference to "Top" and so forth may be references to an absolute or relative map system, where "top" corresponds to "North" or "forward" and "bottom" corresponds to "South" or "backward." Alternatively, the references can be designated with a planar area, in which case "Top" may refer to "upward" and "Bottom" may refer to "downward." FIG. 1 illustrates a two-dimensional set of directions. However, three-dimensional sets of directions are also permitted. For example, the plane illustrated could be one plane of a three plane set of directions including nine additional directions in each of the two other planes for a total of twenty-six directions.

Another measure that can be used, proximity (p), can refer to the proximity of a target wireless device with respect to a given wireless device. For example, p(D1, D2) can indicate the proximity of D1 from D2. Proximity from a wireless device can be determined as a function of received signal strength (RSS) from that device. A decrease in RSS can be interpreted as that the device is moving away and vice versa. Note that proximity can be a continuous value like distance, or discrete levels of separation between two devices.

Proximity measurement can be discrete or continuous in nature. Proximity can be determined using RSS measurements, which may vary significantly depending on multipath effects and interference. Hence, for a particular distance the RSS measurements can have a range. This range of possible values can introduce inaccuracy into proximity estimation, especially if proximity is used as a continuous metric. Proximity, however, can be expressed as a discrete metric, in which case the RSS within a certain range can be associated with a certain proximity level, reducing false precision associated with RSS variations.

Figure 8:
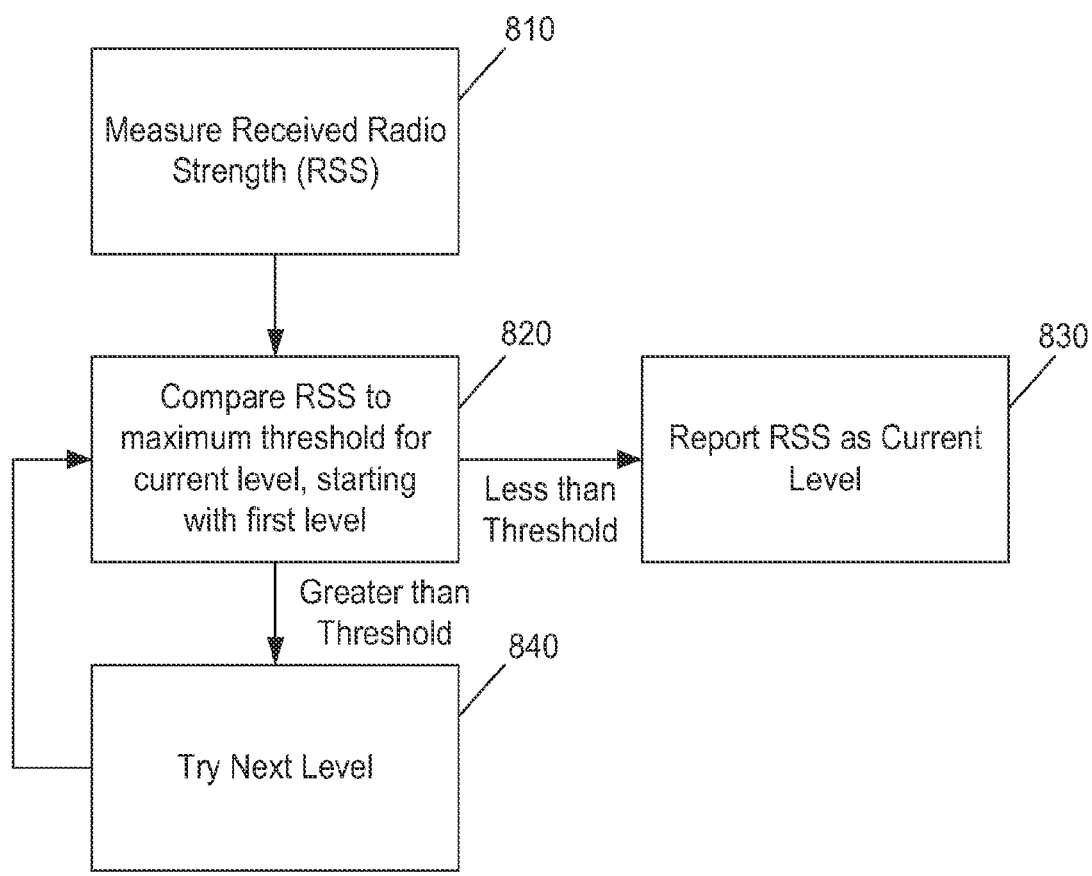
FIG. 8 illustrates a method of reporting received signal strength.

FIG. 8 illustrates an example method of reporting received signal strength (RSS). As shown in FIG. 8, at 810 the received signal strength can be measured. Then, at 820, the received signal strength can be compared to a first threshold for a first level. If the strength is less than the threshold, which may be the maximum range of a current level, then at 830, the received signal strength can be reported at the current level. If the strength is greater than the threshold, then at 840, the signal can be compared to a next threshold, and so on. The last level may have an infinite threshold and may correspond to the shortest distance. Alternatively, the convention can be inverted so that attenuation rather than signal strength is used (where for example −20 dBm is a greater attenuation than 0 but less than −40 dBm). Other approaches are also possible, such as using minimum thresholds instead of maximum thresholds, or using a lookup table rather than the thresholds.

Thus, for example, if 0<RSS<max_level_1 then Proximity=level_1. Otherwise, if max_level_1<RSS<max_level_2 then Proximity=level_2, and so on.

In this case, each device's proximity will either belong to level_1, level_2, or so on. The exact values of max_level_1/max_level_2 can be determined empirically to minimize errors in proximity estimation. One way of choosing the level boundaries is to perform experiments on the particular radio types of interest and to note the typical RSS variation. Then the level gaps can be selected to be much larger than the RSS variations. Thus, the RSS variations can be treated as noise, and the steps in RSS can be selected to be distinguishable from the noise. Thus, the RSS variations due to multipath and interference do not cause devices to jump levels.

Figure 2:
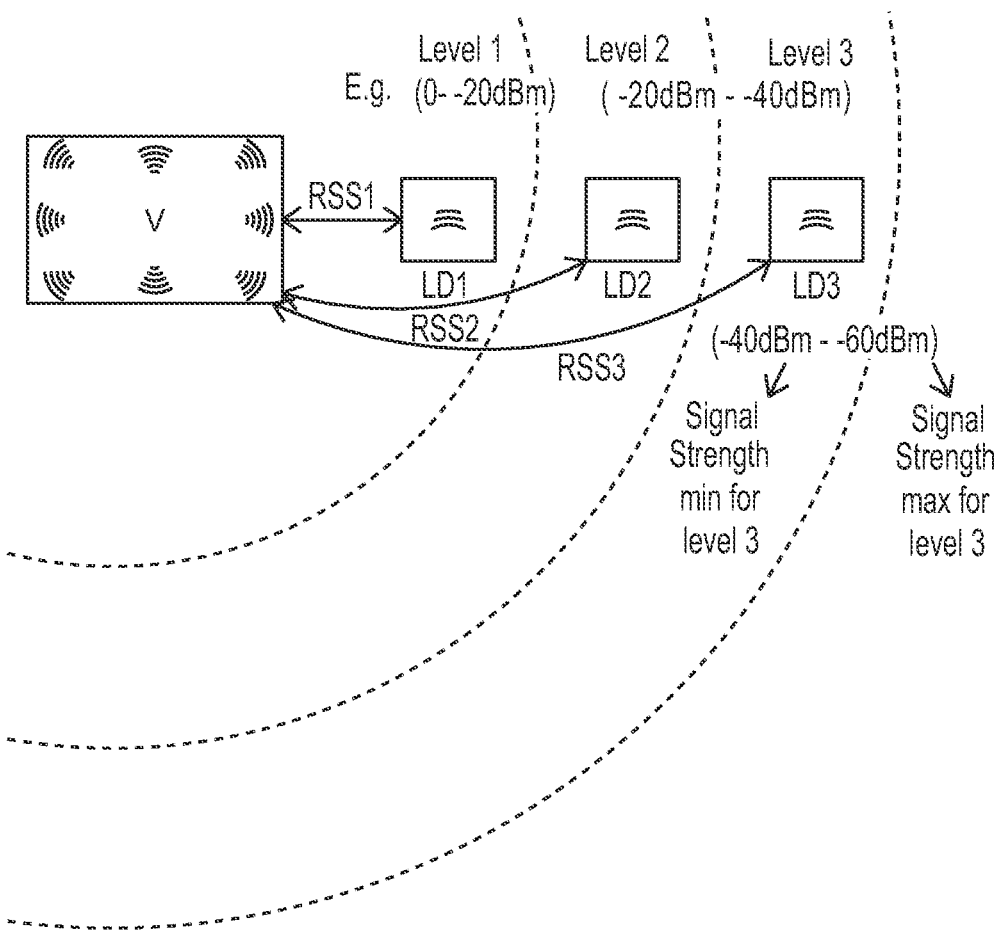
FIG. 2 illustrates estimating discrete proximity levels according to certain embodiments.

FIG. 2 illustrates estimating discrete proximity levels according to certain embodiments. As shown in FIG. 2, a directional radio enabled device (V) can detect three legacy devices (LD1, LD2, LD3) respectively in three windows of proximity. A first device may have attenuation (determined from $RSS_1$) of from 0 to −20 dBm. A second device may have attenuation (determined from $RSS_2$) of from −20 dBm to −40 dBm. A third device may have an attenuation (determined from $RSS_3$) of from −40 dBm to −60 dBm. Signals with attenuation of greater than −60 dBm may be discarded, or may be grouped into a fourth level.

A directional radio enabled device (V) can impart directional intelligence to a legacy device (LD1) under different scenarios. The following inputs can be taken into account: direction of each legacy device with respect to V, e.g., d(LD1, V), d(LD2, V) respectively and proximity of each legacy device with respect to V, e.g., p(LD1, V), p(LD2, V) respectively.

In an example embodiment, taking the above inputs, LD1 can compute the direction and proximity of LD2 (and vice versa, LD2 can compute the direction and proximity of LD1), thus allowing directional interactions between LD1 and LD2. For the purpose of this explanation, it is explained how LD1 can infer the proximity and direction of LD2, while the reverse of LD2 inferring the direction and proximity of LD1 can be done analogously. In an example embodiment, various combinations of orientations between V, LD1 and LD2 can be classified into the following broad categories (all directions while discussing the categories are relative to V). For the sake of being concise, P(LD1, V) will be referred to simply as P1, and P(LD2, V) will be referred to simply as P2.

Figure 3I:
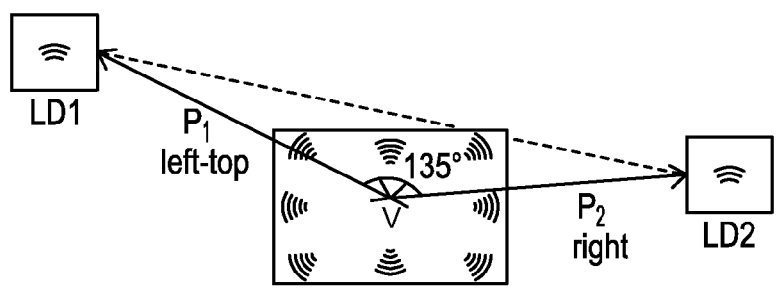
FIG. 3a-3o illustrate possible scenarios with relative positions of a directional device and two legacy devices.
Figure 3M:
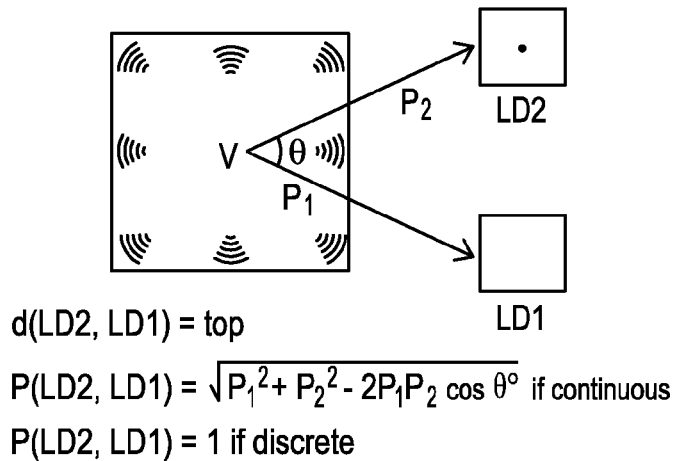
Figure 3N:
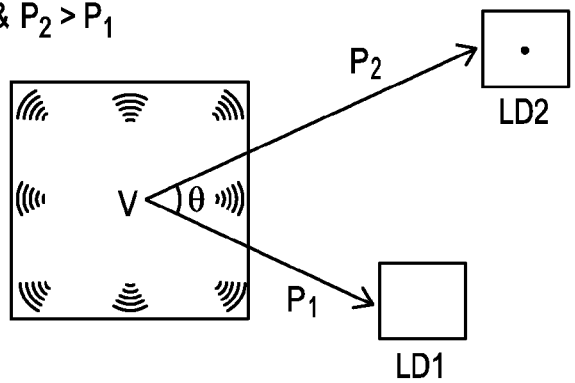
Figure 3O:
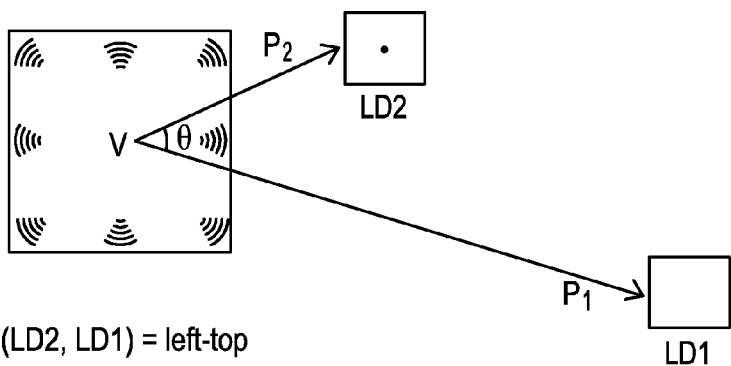

FIGS. 3a-3o illustrate possible scenarios with relative positions of a directional device and two legacy devices. In category 1 (FIGS. 3a-3h), LD1 and LD2 are in opposite directions with respect to V, that is, d(LD1, V)=−d(LD2, V). In this case, d(LD2, LD1)=d(LD2, V) and p(LD2, LD1)=P2+P1.

In FIGS. 3a-3d, four scenarios of category 1 are shown. In FIG. 3a, LD1 is on the right of V and LD2 is on the left of V. In FIG. 3b, the positions are the reverse of (a). In FIG. 3c, LD1 is on top of V and LD2 is on the bottom of V. In FIG. 3d, the positions are the reverse of FIG. 3c.

In FIGS. 3e-3h, four more scenarios of category 1 are shown. In FIG. 3e, LD1 is at bottom left of V and LD2 is at top right of V. In FIG. 3f, the positions are the reverse of (e). In FIG. 3g, LD1 is bottom right of V and LD2 is top left of V. In FIG. 3h, the positions are the reverse of FIG. 3g.

In category 2 (see FIGS. 3i and 3j), LD1 and LD2 are in the same direction with respect to V. In this case, if p(LD2, V)<p(LD1, V) then, d(LD2, LD1)=−d(LD2, V) and p(LD2, LD1)=P1−P2. Whereas, if P2>P1 then, d(LD2, LD1)=d(LD2, V) and p(LD2, LD1)=P2−P1. Alternatively, if P2=P1 then, d(LD2, LD1)=Center and p(LD2, LD1)=0.

In FIGS. 3i and 3j, two scenarios of category 2 are illustrated, while fourteen other scenarios (corresponding to the seven other possible relations between V and LD1/LD2) can be understood as being similar. In a first scenario, LD1 is farther to the right of V than is LD2. In a second scenario, the positions of LD1 and LD2 are exchanged.

In category 3 (see FIG. 3k), LD1 is on the left-top (or on the left-bottom) and LD2 is on the right-top (or on the right-bottom), referring to the system of coordinates shown in FIG. 1. In this case, d(LD2, LD1)=right. Additionally, if proximity is continuous, p(LD2, LD1)=sqrt ($P1^2+P2^2$), whereas if proximity is discrete, p(LD2, LD1)=P2+P1. Although FIG. 3k only illustrates the situation in which LD1 is in the upper left and LD2 is in the upper right, it should be understood that the same principles apply to quarter rotations and mirror images.

For example, in category 4 (not shown, a mirror image of category 3), LD1 is on the right-top (or on the right-bottom) and LD2 is on the left-top (or on the left-bottom). In this case, d(LD2, LD1)=left. If proximity is continuous, p(LD2, LD1)=sqrt (P2^2+P1^2). Alternatively, if proximity is discrete, p(LD2, LD1)=P2+P1.

In category 5 (see FIG. 3*l*), LD1 is on the left-top (or right-top) and LD2 is on the right (or left) side. In this case, d(LD2, LD1)=right-bottom (left-bottom). Moreover, if proximity is continuous, p(LD2, LD1)=sqrt (P1^2+P2^2−2P1P2 cos(135)) and if proximity is discrete, p(LD2, LD1)=P1+P2. Although FIG. 3*l* only illustrates the situation in which LD1 is in the upper left and LD2 is in the right, it should be understood that the same principles apply to quarter rotations and mirror images.

For example, in category 6 (not shown), LD1 is on the left-bottom (or right-bottom) and LD2 is on the right (or left) side. In this case, d(LD2, LD1)=right-top (left-top). If proximity is continuous, p(LD2, LD1)=sqrt (P1^2+P2^2−2P1P2 cos(135)), whereas if proximity is discrete, p(LD2, LD1)=P2+P1.

In category 7 (see FIGS. 3*m*-3*o*), both LD1 and LD2 are on the same side and the angle of separation (theta) is less than 90 degrees. In a first scenario (Case a, FIG. 3*m*), if |P1−P2|<delta (delta>0, delta=1 for discrete proximity) then d(LD2, LD1)=top and if proximity is continuous, p(LD2, LD1)=sqrt (P1^2+P2^2−2P1P2 cos(theta)), otherwise if proximity is discrete, p(LD2, LD1)=1.

Alternatively, in a second scenario (Case b, FIG. 3*n*), if P2−P1>delta, then d(LD2, LD1)=right-top and if proximity is continuous, p(LD2, LD1)=sqrt (P1^2+P2^2−2P1P2 cos (theta)), while if proximity is discrete, p(LD2, LD1)=P2−P1.

Otherwise, in a third scenario (Case c, FIG. 3*o*), if P1−P2>delta, then d(LD2, LD1)=left-top and if proximity is continuous, p(LD2, LD1)=sqrt (P1^2+P2^2−2P1P2 cos (theta)), whereas if proximity is discrete, p(LD2, LD1)=P1−P2.

In an example embodiment, signal strength fluctuations can be addressed in various ways when determining proximity levels in different environments. Thus, signal strength fluctuations can be limited in terms of impact on proximity estimation. For example, FIG. 4 illustrates an environment including a user interface according to certain embodiments.

As shown in FIG. 4, an environment may include a closest legacy device (LD1), two legacy devices in a second range (LD2, which is the legacy device of interest and LD4), and one legacy device in a third range (LD3). LD1 may have a normalized RSS of −4 dBm, whereas LD2 and LD4 may have normalized RSS of −15 dBm, and LD3 may have normalized RSS of −30 dBm. This may be an environment displayed on a user interface.

FIG. 5 illustrates ambiguities caused by received signal strength fluctuations. For example, if legacy devices LD1 and LD2 are located very close to each other. As seen in FIG. 4, LD1 is closer to V than LD2 is to V. However, due to signal strength fluctuations, it might be possible that the mean signal strength from LD2 is stronger at V, which can actually lead to misleading information, especially for user interfaces, where LD2 may be shown closer to V.

Thus, as shown in FIG. 5, the true order is shown on the left side, but, due to fluctuations, a reversed order is shown on the right side, in which LD1 has an RSS of −21 dBm and LD2 has an RSS of −20 dBm.

In order to safeguard against such misrepresentations, a system can be configured to infer that the locations of LD1 and LD2 are within an error threshold for estimating proximity. Accordingly, LD1 and LD2 can be shown as being on the same discrete distance from V (as illustrated in FIG. 6).

As shown in FIG. 6, when the difference in RSS between two legacy devices is less than some threshold (for example, less than twice an average signal to noise ratio (SNR) variation), the two devices can be displayed in a same level in terms of proximity.

Alternatively, the system can clearly inform the user that although the system can approximate the distance of LD1 and LD2 from V, the relative distancing between LD1 and LD2 themselves is not clear. This can be achieved by defining an error interval, such that if the signal strength measurements of two devices are within that error interval, the system flags that both devices are approximately same distance with their relative positioning unclear. This approach of flagging can prevent incorrect, ambiguous, or misleading representation of these devices to the user.

The exact error bounds may depend on the level of signal strength fluctuation in any particular environment. If this setup is operating in outdoor environment with minimal multipath and interference, then these error bounds may be small. In indoor environments, however, these error bounds for signal strength measurements can be higher.

There are various ways of estimating the level of fluctuation in any environment. In an example embodiment, when V powers up, it measures the signal strength from other wireless devices in the environment. For each device (identified, for example, by their medium access control (MAC) address), the system in V can keep track of the maximum and minimum signal strength heard over the measurement period by V. The exact measurement period can be empirically selected, such that sufficient signal strength samples can be collected for each device.

If the wireless devices are mobile, their signal strengths may vary significantly due to movement. In order to filter out such devices, measurements from more than one access points in the environment can be used. These may be static in any setting and periodically broadcast special beacon messages that can aid signal strength measurements.

In an example embodiment, for any given MAC address, the Variation(MAC)=RSSMAX(MAC)−RSSMIN(MAC). Thus, the average signal strength fluctuation can be determined as Variation(Environment)=max(RSSIMAX (MAC_i)) where i=0 to n, for n wireless devices observed in the environment, which may be a more conservative estimate. Alternatively, the average signal strength fluctuation can be determined as Variation(Environment)=median(RSSIMAX (MAC_i)) where i=0 to n, for n wireless devices observed in the environment, which can be an average estimate. In another alternative, the average signal strength fluctuation can be determined as Variation(Environment)=min(RSSI-MAX(MAC_i)) where i=0 to n, for n wireless devices observed in the environment, which may be less conservative.

When the NORMALIZED_RSS of two devices are within Variation(Environment), they can be shown on the same discrete distance as each other.

Figure 9:
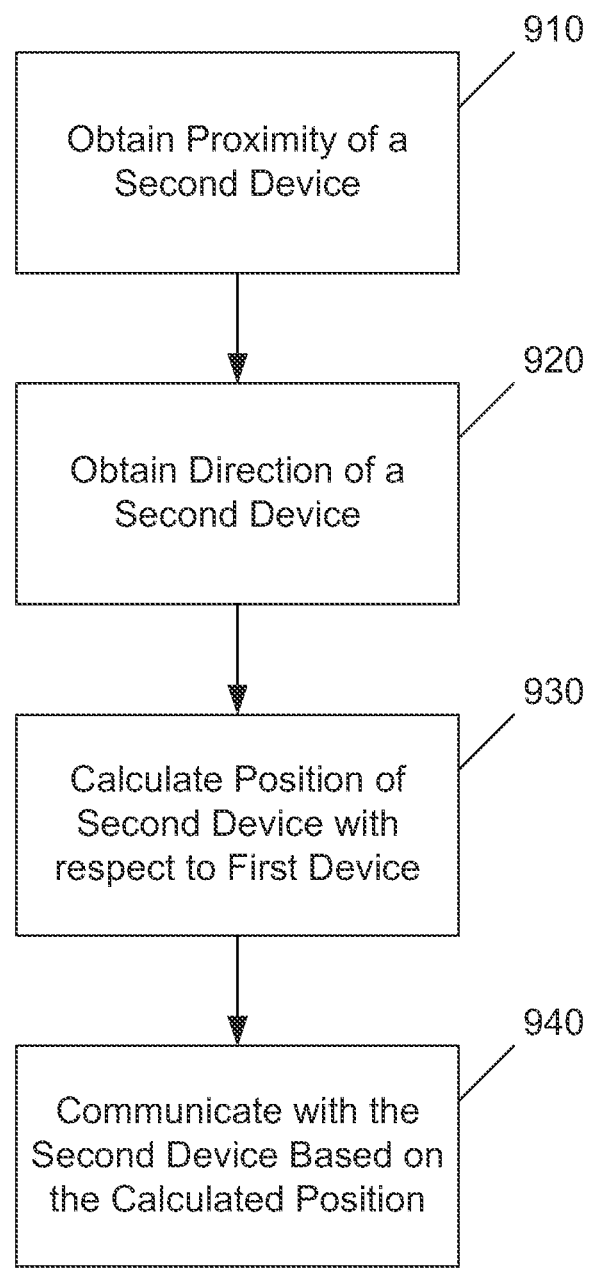
FIG. 9 illustrates a method according to certain embodiments.

FIG. 9 illustrates a method according to certain embodiments. As shown in FIG. 9, a method can include, at 910, obtaining, at a first device from a serving device, proximity information regarding a second device. The proximity information can be a relative proximity of the second device with respect to the serving device. The first device and the second device can be the legacy devices discussed above. The serving device can be a direction enabled radio device discussed above. The proximity information can be provided in either a continuous or discrete format. A discrete format can mean that one of a small number of ranges (for example ten or fewer ranges) is identified. A continuous format can mean a range in meters, feet, or other standard units of measurement or fractions thereof. The proximity information can be provided individually or as part of a list, and can be either broadcast to all nearby units or individually provided to particular nearby units, by the serving device. Obtaining the proximity information can include receiving a wireless signal directly from the serving device, or from another device that received the information from the serving device.

The method can also include, at 920, obtaining, at the first device from the serving device, direction information regarding the second device. The direction information can be sent and received like the proximity information and can be provided together with or separately from the proximity information. Like the proximity information, the direction information can be either continuous or discrete. Moreover, the direction information can be two-dimensional or three-dimensional. The direction information can be relative information. For example, as discussed above, the direction information may be one of eight directions with respect to the serving device.

The method can further include, at 930, calculating a position of the second device with respect to the first device based on the proximity information and based on the direction information. Both the proximity information and the direction information can be used in combination to determine a relative location of the second device with respect to the first device. This calculation can be performed by the first device.

The method can additionally include, at 940, communicating with the second device based on the position. The communicating can involve starting a communication session with the second device, or performing other actions such as flicking content to the second device. The method of FIG. 9 can be performed by, for example, one of the legacy devices illustrated in FIG. 7. In addition to the above transfers of information, the first device may receive or derive its own relative direction and/or proximity information with respect to the service device. This information may be received from the service device, or may be obtained in another way, such as being relayed from another similarly configured legacy device.

Figure 10:
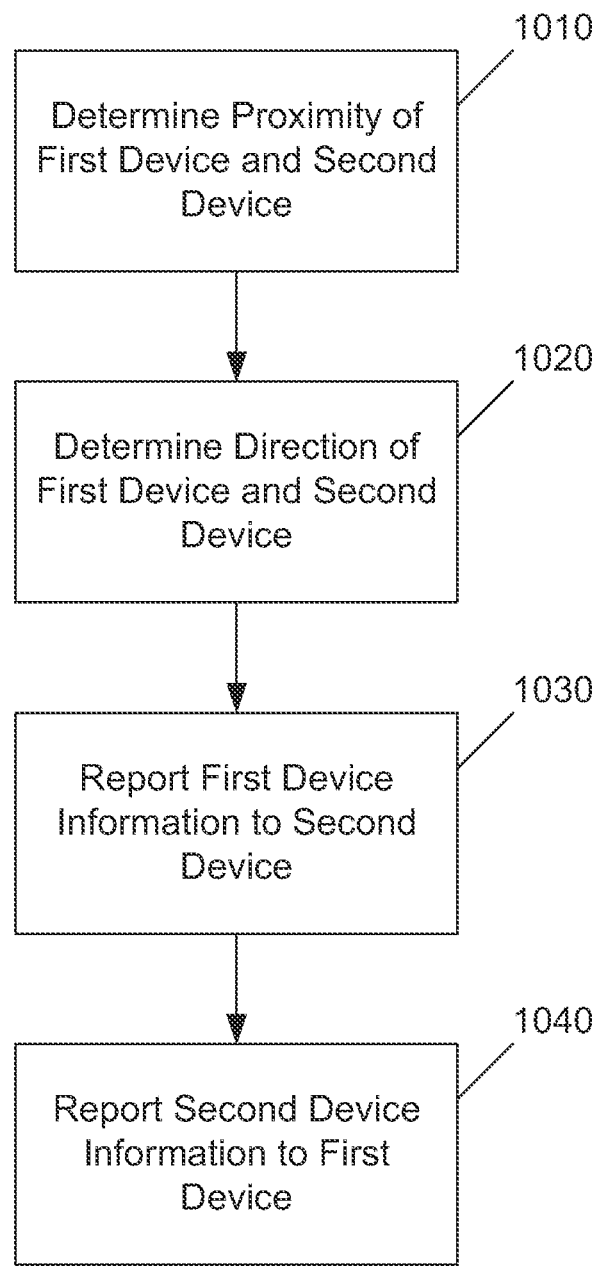
FIG. 10 illustrates another method according to certain embodiments.

FIG. 10 illustrates another method according to certain embodiments. As shown in FIG. 10, a method can include, at 1010, determining, at a serving device, first proximity information regarding a first device and second proximity information regarding a second device. The determination of the proximity of the devices can be based on received signal strength of the devices, as discussed above.

The method can also include, at 1020, determining, at the serving device, first direction information regarding the first device and second direction information regarding the second device. The direction may be determined using a directional antenna of the serving device. The serving device, therefore, may be a device with a directional antenna or other direction-enable radio. The first device and the second device may be legacy devices described above.

The method can further include, at 1030, reporting the first proximity information and the first direction information to the second device. The reporting can be explicit (for example in a message that explicitly reports the information) or implicit (the content of the information may be implied by another message or transmission or absence thereof).

Likewise, the method can additionally include, at 1040, reporting the second proximity information and the second direction information to the first device. This reporting can be concurrent with the first reporting or separate from it. For example, individual messages can describe the first device and the second device respectively. Alternatively, a single message can describe both the first device and the second device together. Alternatively, a single message can describe the proximity of both devices and another message describe the direction of both devices. Thus, the first device may be provided with its own direction and proximity with respect to the serving device at the same time the first device is provided with the direction and proximity information regarding the second device. The first device can then, in certain embodiments, relay this direction and proximity information to the second device.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
    obtaining, by a first device from a serving device, proximity information regarding a second device;
    obtaining, by the first device from the serving device, direction information regarding the second device;
    calculating, by the first device, a position of the second device with respect to the first device based on the proximity information and based on the direction information; and
    communicating, by the first device, with the second device based on the position,
    wherein the proximity information comprises relative proximity information with respect to the serving device and the direction information comprises relative direction information with respect to the serving device.

2. The method of claim 1, wherein the obtaining the proximity information comprises obtaining discrete proximity information with respect to the serving device.

3. The method of claim 1, wherein the obtaining the direction information comprises obtaining discrete direction information with respect to the serving device.

4. An apparatus, comprising:
    at least one processor; and
    at least one memory including computer program code,
    wherein the at least one memory and the computer program code are configured to, with the at least one processor, cause an apparatus at least to
    obtain, at a first device from a serving device, proximity information regarding a second device,
    obtain, at the first device from the serving device, direction information regarding the second device,
    calculate a position of the second device with respect to the first device based on the proximity information and based on the direction information, and
    communicate with the second device based on the position,
    wherein the proximity information comprises relative proximity information with respect to the serving device and the direction information comprises relative direction information with respect to the serving device.

5. The apparatus of claim 4, wherein the at least one memory and the computer program code are configured to, with the at least one processor, cause an apparatus at least to obtain discrete proximity information with respect to the serving device.

6. The apparatus of claim 4, wherein the at least one memory and the computer program code are configured to, with the at least one processor, cause an apparatus at least to obtain discrete direction information with respect to the serving device.

7. A method, comprising:
- determining, by a serving device, first proximity information regarding a first device and second proximity information regarding a second device;
- determining, by the serving device, first direction information regarding the first device and second direction information regarding the second device;
- reporting, by the first device, the first proximity information and the first direction information to the second device; and
- reporting, by the first device, the second proximity information and the second direction information to the first device,
- wherein the proximity information comprises relative proximity information with respect to the serving device and the direction information comprises relative direction information with respect to the serving device.

8. The method of claim 7, wherein the reporting the first proximity information or the second proximity information comprises reporting discrete proximity information with respect to the serving device.

9. The method of claim 7, wherein the reporting the first direction information or the second direction information comprises reporting discrete direction information with respect to the serving device.

10. An apparatus, comprising:
- at least one processor; and
- at least one memory including computer program code,
- wherein the at least one memory and the computer program code are configured to, with the at least one processor, cause an apparatus at least to
- determine, at a serving device, first proximity information regarding a first device and second proximity information regarding a second device;
- determine, at the serving device, first direction information regarding the first device and second direction information regarding the second device;
- report the first proximity information and the first direction information to the second device; and
- report the second proximity information and the second direction information to the first device,
- wherein the proximity information comprises relative proximity information with respect to the serving device and the direction information comprises relative direction information with respect to the serving device.

11. The apparatus of claim 10, wherein the at least one memory and the computer program code are configured to, with the at least one processor, cause an apparatus at least to report discrete proximity information with respect to the serving device.

12. The apparatus of claim 10, wherein the at least one memory and the computer program code are configured to, with the at least one processor, cause an apparatus at least to report discrete direction information with respect to the serving device.

* * * * *